US011316689B2

(12) United States Patent
Srinivasan et al.

(10) Patent No.: US 11,316,689 B2
(45) Date of Patent: Apr. 26, 2022

(54) TRUSTED TOKEN RELAY INFRASTRUCTURE

(71) Applicant: Oracle International Corporation, Redwood Shores, CA (US)

(72) Inventors: Venkataraman Uppili Srinivasan, Fremont, CA (US); Andre Luiz Moreira Correa Neto, Brasilia (BR); Lee David Coller, Redondo Beach, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 16/144,225

(22) Filed: Sep. 27, 2018

(65) Prior Publication Data

US 2019/0103968 A1 Apr. 4, 2019

Related U.S. Application Data

(60) Provisional application No. 62/664,703, filed on Apr. 30, 2018, provisional application No. 62/566,186, filed on Sep. 29, 2017.

(51) Int. Cl.
*H04L 9/32* (2006.01)
*H04L 29/06* (2006.01)
(Continued)

(52) U.S. Cl.
CPC .......... *H04L 9/3213* (2013.01); *G06F 21/335* (2013.01); *G06F 21/41* (2013.01);
(Continued)

(58) Field of Classification Search
CPC ..... H04L 9/3213; H04L 9/0894; H04L 63/10; H04L 63/0815; H04L 63/102;
(Continued)

(56) References Cited

U.S. PATENT DOCUMENTS 8,132,242 B1 * 3/2012 Wu ...................... H04L 63/0884
726/8
9,781,122 B1 * 10/2017 Wilson .................... H04L 63/08
(Continued)

OTHER PUBLICATIONS

Oracle® Cloud, Administering Oracle Identity Cloud Service, Release 17.3.6, E55882-15, Sep. 2017, 234 pages.
(Continued)

*Primary Examiner* — James R Turchen
(74) *Attorney, Agent, or Firm* — Kilpatrick Townsend & Stockton LLP

(57) ABSTRACT

A token relay system is provided that enables a client requester to acquire a properly scoped access token issued by a token issuer authority in a secure manner. The client requestor may be a non-confidential client (e.g., a JavaScript application). The token relay system is a trusted and confidential client of the token issuer authority. Upon receiving an access token request from a client, the token relay system is configured to send a request to the token issuer authority (e.g., OAuth server) requesting an access token on behalf of the requestor. The token issuer authority may then respond by issuing an access token with the appropriate scope to the token relay system. The token relay system may then forward the access token received from the token issuer to the requesting client, who may then use the access token to access a protected resource (e.g., a REST resource).

20 Claims, 6 Drawing Sheets

(51) Int. Cl.
  *G06F 21/41* (2013.01)
  *G06F 21/33* (2013.01)
  *H04L 9/08* (2006.01)

(52) U.S. Cl.
  CPC ........ *H04L 9/0894* (2013.01); *H04L 63/0815* (2013.01); *H04L 63/10* (2013.01); *H04L 63/102* (2013.01); *H04L 63/1466* (2013.01); *H04L 63/1483* (2013.01); *H04L 63/20* (2013.01)

(58) Field of Classification Search
  CPC . H04L 63/1466; H04L 63/1483; H04L 63/20; G06F 21/41; G06F 21/335
  See application file for complete search history.

(56) References Cited

U.S. PATENT DOCUMENTS

| | | | | |
|---|---|---|---|---|
| 10,375,053 | B2* | 8/2019 | Sridharan | G06Q 10/10 |
| 2004/0088349 | A1* | 5/2004 | Beck | H04L 63/0407 709/203 |
| 2010/0325441 | A1* | 12/2010 | Laurie | H04L 63/0815 713/185 |
| 2011/0162072 | A1* | 6/2011 | Hay | H04L 67/02 726/25 |
| 2014/0208119 | A1* | 7/2014 | Chang | H04L 67/42 713/176 |
| 2014/0282989 | A1* | 9/2014 | Young | H04L 63/08 726/9 |
| 2016/0028737 | A1* | 1/2016 | Srinivasan | H04L 63/102 726/1 |
| 2016/0226859 | A1* | 8/2016 | Sondhi | H04L 63/20 |
| 2016/0286400 | A1* | 9/2016 | Pal | H04L 9/3213 |
| 2017/0048339 | A1* | 2/2017 | Straub | G06F 8/40 |
| 2017/0195407 | A1* | 7/2017 | Miura | H04L 67/1002 |
| 2017/0244864 | A1* | 8/2017 | Ishino | H04L 63/108 |
| 2017/0324749 | A1* | 11/2017 | Bhargava | H04L 63/108 |
| 2018/0041510 | A1* | 2/2018 | Burch | H04L 63/08 |
| 2018/0084085 | A1* | 3/2018 | Shanmugasundaram | H04L 12/2818 |
| 2018/0113896 | A1* | 4/2018 | Justin | G06F 16/23 |
| 2018/0349602 | A1* | 12/2018 | Johns | G06F 21/552 |
| 2018/0351986 | A1* | 12/2018 | Johns | G06F 11/1438 |
| 2019/0028512 | A1* | 1/2019 | Bailey | H04L 67/146 |

OTHER PUBLICATIONS

Oracle Identity Cloud Service, A Business Overview, Oracle White Paper, Sep. 2016, 11 pages.
Oracle® Cloud, Understanding Identity Concepts, Release 17.1.4, E60585-13, Feb. 2017, 40 pages.
Hardt, The OAuth 2.0 Authorization Framework, Internet Engineering Task Force (IETF) RFC 6749, Oct. 2012, pp. 1-76 (Retrieved from the internet <URL: https://tools.ietf.org/html/rfc6749>).

* cited by examiner

TRUSTED TOKEN RELAY INFRASTRUCTURE

CROSS-REFERENCES TO RELATED APPLICATIONS

The present application is a non-provisional of and claims the benefit and priority of U.S. Provisional Application No. 62/566,186, filed Sep. 29, 2017, entitled "TRUSTED TOKEN RELAY INFRASTRUCTURE," and U.S. Provisional Application No. 62/664,703, filed Apr. 30, 2018, entitled "TRUSTED TOKEN RELAY INFRASTRUCTURE." The entire contents of the 62/566,186 and 62/664,703 applications are incorporated herein by reference in their entirety for all purposes.

BACKGROUND

With large amounts of data being stored on connected devices and further with the increasing popularity of cloud-based services, the challenge of preventing unauthorized access to data is at the forefront of technology providers. Various authentication and authorization standards exist and/or are being developed for controlling access to data. One such standard is OAuth (Open Authorization), which is an open standard defining a token-based authorization protocol for accessing resources. For example, OAuth 2.0 is an authorization framework that enables an application ("client") to obtain limited access to a protected resource (e.g., HTTP resource, a REST (Representational State Transfer) resource) by presenting an access token for the protected resource. Various vendors are adopting OAuth as a data access protocol. For example, OAuth is used to secure access to various cloud services (e.g., Oracle Cloud) provided by Oracle Corporation of Redwood Shores, Calif. In some instances, REST resources by policy only accept an OAuth token in an OAuth based identity environment.

The OAuth standard defines a set of interactions (protocol flows) for clients (e.g., applications) to acquire tokens, which can then be used to securely access protected resources such as REST based web resources. The most secure posture that an OAuth client can assume is that of a "confidential client," where the client is required to be able to securely maintain a secret (e.g., client identifying credentials such as a certificate/key pair). A confidential client can validate itself using the secret information and then get an access token to access a protected resource. However, many times a client, such as a browser based application (e.g., a JavaScript application in the browser) cannot store or keep a secret. Such a client is commonly referred to as a non-confidential client or a public client (referred to as a non-confidential client in this disclosure). For example, a public or non-confidential client is an application that is not capable of keeping a client password confidential. Examples of non-confidential clients include browser based applications (e.g., a JavaScript application executed by a browser). A browser is typically not a confidential environment in which secrets can be held.

When a client is a non-confidential client, the security of its environment cannot be guaranteed or trusted like for a confidential client. Typical industry approaches to this include enabling token access from a non-confidential client (e.g., from the browser) using less secure OAuth flows such as "implicit grant" or "resource owner credential" flows. An "implicit grant" flow, which is unable to ensure the authenticity of a client requesting an access token, is notoriously vulnerable to many types of attacks. Since a non-confidential client such as a JavaScript application cannot keep a secret, it becomes very easy for a rogue application to impersonate a legitimate application. As part of the implicit flow, a token requestor has to provide only two pieces of information for requesting an access token, namely, a client ID and a redirect URL, and none of these pieces of information can be securely kept. Additionally, in the absence of a secret, the OAuth server cannot really be sure of the requesting client or application that the OAuth server is issuing access tokens to. The "resource owner credential" flow requires challenging for end user credentials by the client (e.g., JavaScript executed by a browser), which is a very unsecure practice. As a result, in general, for non-confidential clients, conventional industry solutions lack the security assurance that is equivalent of a confidential client with a security framework that is customizable for any web resource and any granularity of web application domains.

Due to the known security limitations in employing the standard OAuth flows to acquire tokens for a non-confidential client (e.g., a browser-based application), many enterprise solutions involving JavaScript based User Interfaces (UIs) limit the use of REST access from JavaScript applications to non or less critical data only and, where sensitive data is involved, they resort to pushing that action to the back end, thereby compromising on being pure JavaScript driven and lightweight UIs. Other non-critical web applications tend to utilize the previously stated OAuth flows that are known to lack adequate security.

BRIEF SUMMARY

The present disclosure relates to access management techniques. More particularly, an infrastructure is provided that enables a client requester to acquire a properly scoped access token issued by a token issuer authority in a secure manner. The client requestor may be a non-confidential or public client, i.e., an application that is not capable of storing or keeping a secret. Various inventive embodiments are described herein, including methods, systems, non-transitory computer-readable media storing programs, code, or instructions executable by one or more processors, and the like.

A token relay infrastructure or system is provided that enables a client requester to acquire a properly scoped access token issued by a token issuer authority in a secure manner. The client requestor may be a non-confidential client. Examples of non-confidential clients include browser-based applications such as JavaScript applications. In certain embodiments, the token relay system is a trusted and confidential client of the token issuer authority. Upon receiving an access token request from a client, the token relay system is configured to send a request to the token issuer authority (also sometimes referred to as a token signatory authority) (e.g., OAuth server) requesting an access token on behalf of the requestor. The token issuer authority may then respond by issuing an access token with the appropriate scope to the token relay system. The token issuer authority may, for example, issue an OAuth token. The token relay system may then forward the access token received from the token issuer to the requesting client, who may then use the access token to access a protected resource (e.g., a REST resource).

In various embodiments, the token issuer authority may be an authorization server that is configured to issue access tokens to clients. The token issuer authority may be, for example, an OAuth server configured to issue OAuth tokens. In some embodiments, the token issuer authority may be part of a security and access management system such as Oracle's Identity Cloud Service (IDCS). For example, a non-confidential client such as a JavaScript application executed by a browser may use the token relay system to acquire a properly scoped OAuth token signed by an OAuth signatory server.

In certain embodiments, the token relay system (or a component of the token relay system that requests access tokens from the token issue authority) is a trusted and confidential client of the token signature authority (e.g., an OAuth server), and is trusted by the token issuer authority to assert a user identity on behalf of a user requesting an access token. A trusted client is one that is able to ask for a token without requiring an actual authorization code.

In certain embodiments, processing may be triggered when the token relay system receives a request from a requestor client, such as a non-confidential client, for an access token for enabling the requestor client to access a protected resource, such as a REST resource. For example, the token request may be received by the token relay system as part of an authenticated user single sign-on (SSO) session, or when a user is trying to access a protected resource in an authenticated session. Responsive to receiving the token request from the client requestor, the token relay system may, as a trusted and confidential client of the token issuer authority, send a request to the token issuer authority (e.g., an OAuth server) requesting an access token on behalf of the client requestor. The token issuer authority may then respond by issuing and sending the requested access token with the appropriate scopes to the token relay system. The token relay system may then forward the access token received from the token issuer authority to the requesting client. The requesting client may then use the access token received from the token relay system to access the protected resource.

In certain embodiments, a token relay system may receive a first request for an access token for enabling a client to access a resource. Responsive to receiving the first request, the token relay system may transmit to a token issuer system, a second request requesting an access token on behalf of the client. The token relay system may receive from the token issuer system, an access token issued by the token issuer system in response to the second request. The token relay system may then communicate to the client the access token received by the token relay system from the token issuer system, wherein the access token communicated to the client enables the client to access the resource. The client may then use the access token received from the token relay system to access the resource. The resource may, for example, be a REST resource. The first request may be received by the token relay system as part of an authenticated user session. In some embodiments, the token issuer system may be a server configured to issue tokens according to OAuth standard.

The clients may be of different types including confidential and non-confidential clients. An example of an non-confidential client is a JavaScript application executed by a browser.

In certain embodiments, the first request received by the token relay system from the client may include various pieces of information. For example, the first request may include information identifying a scope for the access token. The access token received by the token relay system from the token issuer system may then be for the scope identified in the first request. The first request may also include other information such as information (e.g., an anti-CSRF token) for protecting against a Cross Site Request Forgery attack, information identifying the client's origin, information related to a session (e.g., a single sign-on cookie or token) during which the first request is generated by the client, and other information.

In certain embodiments, prior to transmitting the second request to the token issuer system, the token relay system may perform processing including validating the anti-CSRF information/token, and verifying that the client is allowed to request a token for the scope identified in the first request. In some embodiments, the anti-CSRF information/token may encode an identifier identifying the client from whom the first request is received by the token relay system.

In certain embodiments, a token may be requested from a token issuer authority on behalf of a client. Responsive to the requesting, an access token issued by the token issuer authority may be received and then communicated to the client, wherein the access token communicated to the client enables the client to access a resource. Prior to requesting the access token on behalf of a client, a first request may be received requesting the access token. The first request may also include information identifying a scope for which the access token is requested. The access token issued by the token issuer authority may be for the scope identified in the first request.

In some embodiments, the first request may also include information to protect against a Cross Site Request Forgery (CSRF) attack, information identifying the client's origin, and session information for a session during which the first request is generated by the client. Prior to requesting the token from the token issuer authority on behalf of the client, processing may be performed including validating the information to protect against a CSRF attack, and verifying that the client is allowed to request a token for the scope identified in the first request.

The foregoing, together with other features and embodiments will become more apparent upon referring to the following specification, claims, and accompanying drawings.

DETAILED DESCRIPTION

Figure 1:
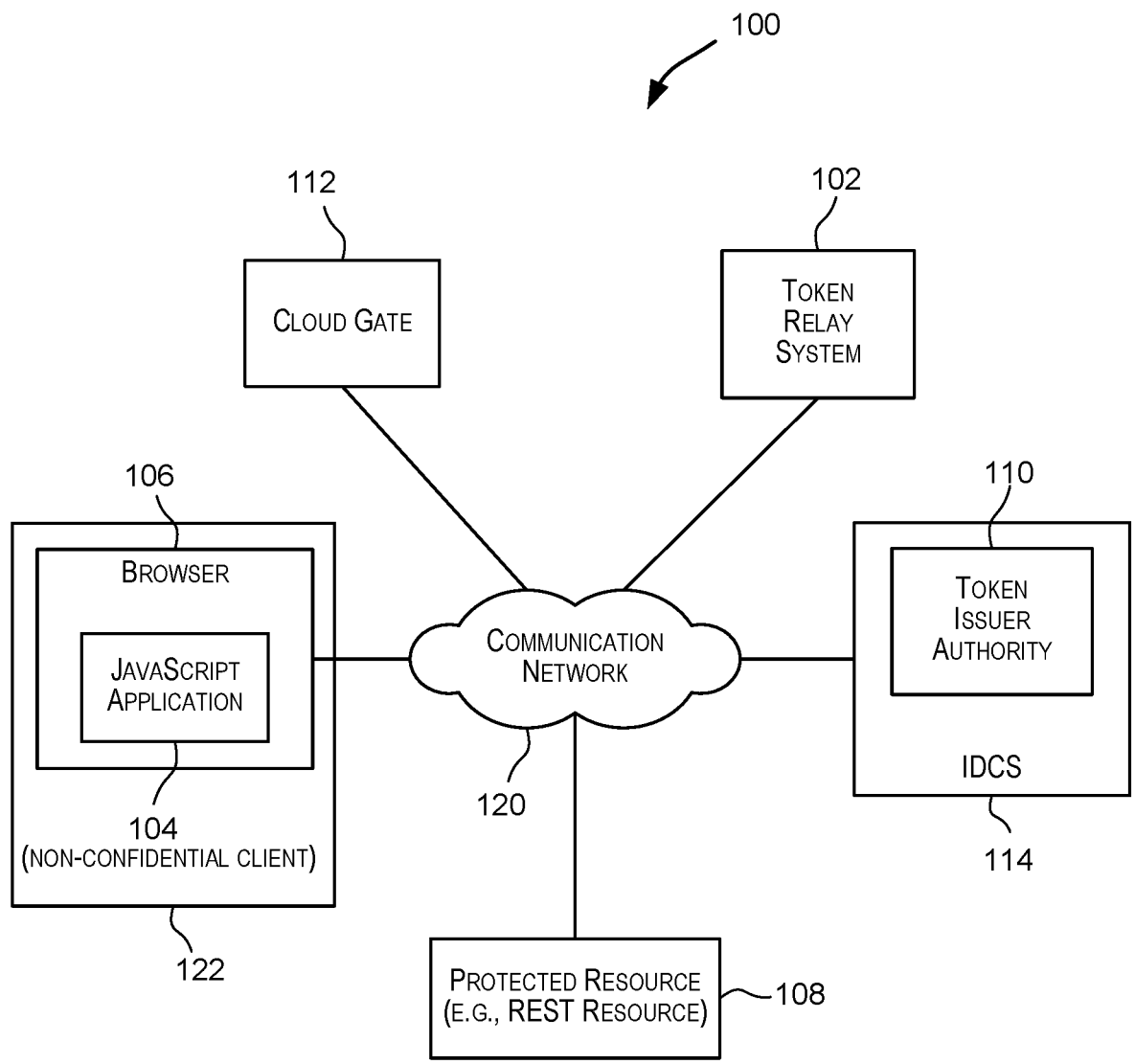
FIG. 1 is a simplified block diagram of a distributed system 100 implementing a token relay service according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to access management techniques. More particularly, an infrastructure is provided that enables a client requester to acquire a properly scoped access token issued by a token issuer authority in a secure manner. The client requestor may be a non-confidential client or public client, i.e., an application that is not capable of storing or keeping a secret. For example, a public or non-confidential client is an application that is not capable of keeping a client password confidential. Various inventive embodiments are described herein, including methods, systems, non-transitory computer-readable storage media storing programs, code, or instructions executable by one or more processors, and the like.

Examples of non-confidential or public clients include browser-based applications such as a JavaScript application executed by a browser. A JavaScript application may use the services provided by the token relay system to acquire an access token in a secure manner. A browser may be capable of running one or more of such independent runtimes (e.g., multiple JavaScripts). Each JavaScript typically runs within the sandbox of a particular page of a web domain. While the services provided by the token relay system are particularly useful for non-confidential or public clients, this is not intended to be limiting—the services may also be used by other types of clients, such as confidential clients, executing in various different environments (e.g., other than a browser environment) to acquire tokens in a secure manner.

A token relay infrastructure or system is provided that enables a client requester to acquire a properly scoped access token issued by a token issuer authority in a secure manner. The client requestor may be a non-confidential client. In certain embodiments, the token relay system is a trusted and confidential client of the token issuer authority. Upon receiving an access token request from a client, the token relay system is configured to send a request to the token issuer authority (also sometimes referred to as a token signatory authority) (e.g., OAuth server) requesting an access token on behalf of the requestor. The token issuer authority may then respond by issuing an access token with the appropriate scope to the token relay system. The token issuer authority may, for example, issue an OAuth token. The token relay system may then forward the access token received from the token issuer to the requesting client, who may then use the access token to access a protected resource (e.g., a REST resource).

The token relay system may be implemented in various different environments including a cloud environment, an on-premise environment, a hybrid environment (e.g., an environment comprising a cloud environment and an on-premise environment), and the like. In certain embodiments, the token relay system implements a trusted middle tier service component (a token relay service component) and provides a technique to securely bind non-confidential clients (e.g., JavaScript applications in one or more web application domains) in one or more web application domains to the token relay service provided by the token relay system.

In various embodiments, the token issuer authority may be an authorization server that is configured to issue access tokens to clients. The token issuer authority may be, for example, an OAuth server configured to issue OAuth tokens. In some embodiments, the token issuer authority may be part of a security and access management system such as Oracle's Identity Cloud Service (IDCS). For example, a non-confidential client such as a JavaScript application executed by a browser may use the token relay system to acquire a properly scoped OAuth token signed by an OAuth signatory server.

In certain embodiments, the token relay system (or a component of the token relay system that requests access tokens from the token issue authority) is a trusted and confidential client of the token signature authority (e.g., an OAuth server), and is trusted by the token issuer authority to assert a user identity on behalf of a user requesting an access token. A trusted client is one that is able to ask for a token without requiring an actual authorization code.

In certain embodiments, processing may be triggered when the token relay system receives a request from a requestor client, such as a non-confidential client, for an access token for enabling the requestor client to access a protected resource, such as a REST resource. For example, the token request may be received by the token relay system as part of an authenticated user single sign-on (SSO) session, or when a client is trying to access a protected resource in an authenticated session. Responsive to receiving the token request from the client requestor, the token relay system may, as a trusted and confidential client of the token issuer authority, send a request to the token issuer authority (e.g., an OAuth server) requesting an access token on behalf of the client requestor. The token issuer authority may then respond by issuing and sending the requested access token with the appropriate scopes to the token relay system. The token relay system may then forward the access token received from the token issuer authority to the requesting client. The requesting client may then use the access token received from the token relay system to access the protected resource.

A token request received by the token relay system from a client requestor may include various pieces of information that are used by the token relay system to request a properly scoped token on behalf of the client requestor. For example, in certain embodiments, the token request received by the token relay system from the client requestor (e.g., JavaScript application) may include context information for the token request. This context information may include, for example, information identifying a scope for which the token is being requested, single sign-on (SSO) information for a session during which the token request is generated, client identifier information, information identifying the client's origin, etc. In certain embodiments, a token request received by the token relay system from a client may also include cross site request forgery (CSRF) information, such as a CSRF token.

In certain embodiments, the token relay system may use the information received in the token request from the client requestor to ensure and/or check that the token request is received from a valid client known to the token relay system. The token relay system may then use this information to validate the client before sending a token request to the token issuer authority on behalf of the client. The validation may include verifying that the client is allowed to request a token for the scope identified in the token request. The token relay system may send a token request to the token issuer only upon successful validation and verification of the request received from the client.

The token relay system may also use the information received from the client in the token request to ensure that the requested token is of the proper scope for the requesting client. As indicated above, the information received from the client requestor may include information identifying a scope for the access token. The token relay system may check the requested scope for the access token and then request an access token from the token issuer authority that is properly scoped corresponding to the scope information identified in the token request received from the client.

FIG. 1 is a simplified block diagram of a distributed system 100 implementing a token relay infrastructure according to certain embodiments. The embodiment depicted in FIG. 1 is merely an example and is not intended to unduly limit the scope of claimed embodiments. One of ordinary skill in the art would recognize many possible variations, alternatives, and modifications. For example, in some implementations, distributed system 100 depicted in FIG. 1 may have more or fewer systems or components than those shown in FIG. 1, may combine two or more systems, or may have a different configuration or arrangement of systems.

As depicted in FIG. 1, distributed system 100 comprises multiple systems communicatively coupled to each other via communication network 120. Communication network 120 facilitates communications between the various systems depicted in FIG. 1. Communication network 120 can be of various types and can include one or more communication networks. Examples of communication network 120 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 120 may include any infrastructure that facilitates communications between the various systems depicted in FIG. 1.

In the embodiment depicted in FIG. 1, a client, such as non-confidential client 104, may use the services provided by token relay system 102 to acquire a properly scoped access token from a token issuer authority 110 in a secure manner. Non-confidential client 104 may then use the acquired access token to access a protected resource 108, which, for example, may be a REST resource.

In the embodiment depicted in FIG. 1, the non-confidential client is a JavaScript application 104 executed by a client application such as a browser 106 that may be running on a client data processing system 122. In alternative embodiments, other types of client, including other types of non-confidential clients other than JavaScript applications, may use the services of token relay system 102.

Token issuer authority 110 may be any entity that is configured to issue access tokens in response to requests received from requestors. For example, token issuer authority 110 may be an authorization server such as an OAuth server that is configured to issue OAuth access tokens. The OAuth server may be configured to issue access tokens in compliance with the OAuth 2.0 standard (or other versions or standards of OAuth). The OAuth server and the OAuth protocol are used merely as examples. In alternative embodiments, the services provided by token relay system 102 can also be used for different types of tokens, different token issuing mechanisms, and different token protocols.

In some embodiments, token issuer authority 110 be part of an access or security management system that is configured to provide authentication and/or authorization and data access management services. For example, as shown in FIG. 1, token issuer authority 110 may be part of an Identity Cloud Service (IDCS) 114. An example of an IDCS service is provided by Oracle Corporation® of Redwood Shores, Calif. IDCS 114 may be configured to provide identity and access management capabilities in a multi-tenant cloud environment. IDCS 114 may provide various functionalities such as identity federation that enables secure access to protected resources by exchanging identity information securely, single sign-on (SSO) capabilities (e.g., using standards such as Security Assertion Markup Language (SAML) and OpenID Connect for browser-based user authentication), security using OAuth2 (e.g., for securing programmatic access (e.g., using REST API calls) to resources), tracking users' active sessions using cookies, and the like. IDCS 114 may comprise one or more subsystems. For example, as depicted in FIG. 1, token issuer authority 110, which is configured to issue access tokens, may be a subsystem of IDCS 114.

In some embodiments, protected resource 108 may be hosted by and protected by a resource server (not shown in FIG. 1). In certain embodiments, token issuer authority 110 may be the same as the resource server. The resource server may be a metadata definition pertaining to the token issuer that can refer either to a resource external to the token issuer or to a resource that is internal to the token issuer. In other embodiments, token issuer authority 110 may be a separate entity from a resource server that hosts and protects a protected resource. A single token issuer authority 110 may be configured to issue access tokens for multiple resources that may be hosted and protected by one or more multiple resource servers.

The embodiment depicted in FIG. 1 also includes a Cloud Gate 112 component. In certain embodiments, Cloud Gate 112 is a reverse proxy "access enforcement module" or "policy enforcement point" that secures a web browser and REST API resources using standards such as OAuth2 and OpenID Connect standards. In certain embodiments, Cloud Gate 112 is a component of IDCS 114 and provides for single sign-on (SSO) protection. For example, Cloud Gate 112 may intercept and validate a sign-on cookie and enable (or prevent) single sign-on capabilities upon successful validation of the cookie.

In some embodiments, multiple Cloud Gates may be provided. In yet other embodiments, a Cloud Gate is not needed and requests from a non-confidential client may be communicated to token relay system 102 without an intervening Cloud Gate. Other SSO protection infrastructures, other than Cloud Gate 112, may also be used in alternative embodiments.

In certain embodiments, token relay system 102 uses a set of rules that establish a trust model that is used for issuing tokens. These rules and the trust model is used by token relay system 102 for acquiring access tokens on behalf of non-confidential client requestors. In certain embodiments, the trust model has the following characteristics:

1. Token relay system 102 provides token relay endpoints, which enable a requestor to invoke services of token relay system 102. These endpoints are only available to authenticated user sessions. Accordingly, it is assumed that before a requestor can invoke the services of token relay system 102, the user or requestor has already been successfully authenticated and an authenticated user session has been established for the requestor.

2. The access token request received by token relay system 102 from a requesting client includes information for protecting against a CSRF attack. This information may be in the form of an anti-CSRF token. Accordingly, a non-confidential client (e.g., JavaScript application 104 depicted in FIG. 1) has to first acquire an anti-CSRF token before the non-confidential client can request an access token using token relay system 102. The anti-CSRF token provides an additional level of protection as described below.

3. Token relay system 102 processes a request from a non-confidential client if the origin of non-confidential client is whitelisted in token relay system 102.

4. The non-confidential client can request an access token only for one or more scopes that are authorized by token relay system 102.

Figure 2:
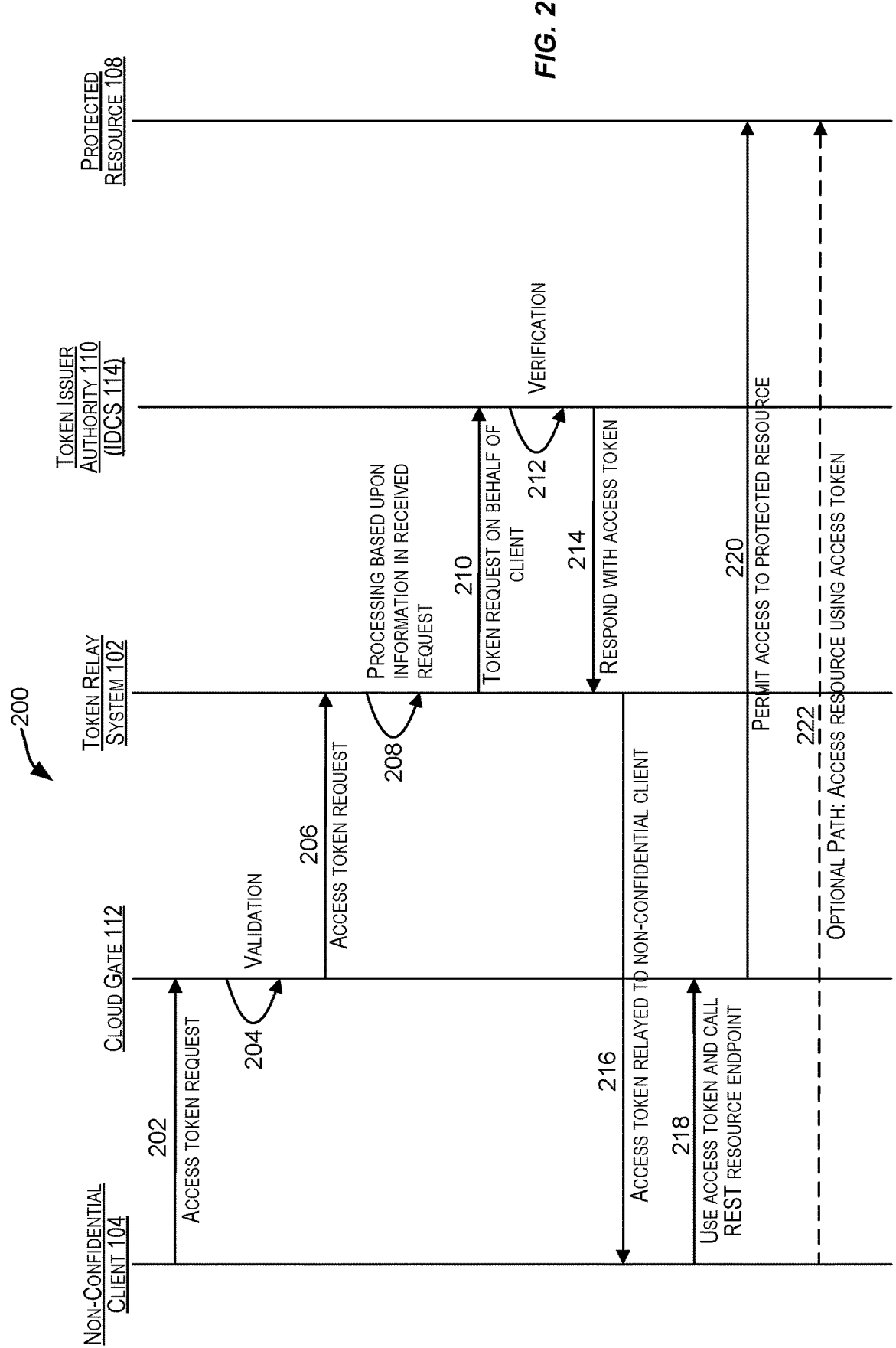
FIG. 2 depicts a simplified flowchart depicting processing performed for acquiring access tokens using the services provided by a token relay system according to certain embodiments.

FIG. 2 depicts a simplified flowchart 200 depicting processing performed for acquiring access tokens using the services provided by a token relay system according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. FIG. 2 depicts the interactions and data flows between the various systems depicted in FIG. 1.

As shown in FIG. 2, at 202, non-confidential client 104 (e.g., JavaScript application loaded in browser 106) requests the services of token relay system 102 for acquiring an access token by sending an access token request to token relay system 102. The request may be made because the non-confidential client wants to access a protected resource 108 (e.g., a REST resource, a SOAP resource) and needs the access token for the access. For example, the JavaScript may need to access a RESTful resource in order to perform some processing such as, for example, presenting information in the browser. The REST resource may be protected based upon an OAuth token that is needed to access the resource. It is quite typical for a JavaScript executed by a browser to access multiple REST resources (e.g., 20 plus resources) from a single page.

In certain embodiments, the request may be made by the non-confidential client making an XHR (XML HTTP Request) call to a token relay service endpoint in Cloud Gate 112. For example, token relay system 102 may provide one or more token relay endpoints that may be invoked by the client requestor to initiate an access token request. In some embodiments, the token relay service may be provided as a web application endpoint provided by token relay system 102.

In some embodiments, the request may be first intercepted by Cloud Gate 112. Accordingly, the request in 202 may be communicated from non-confidential client 104 to Cloud Gate 112, which is then configured to validate the request before forwarding it to token relay system 102.

The access token request in 202 communicated from non-confidential client 104 to Cloud Gate 112 (or to token relay system 102) may include various pieces of data. In certain embodiments the request may include:

(1) A session SSO cookie (single sign-on information)— After a user using a client application is successfully authenticated by an authentication provider such as IDCS, the IDCS is configured to issue an IDCS SSO cookie. In some embodiments, a request to a protected resource (or a Cloud Gate protected resource) triggers IDCS authentication for the requesting user. Upon successful authentication, the IDCS generates an IDCS session cookie for the session. This cookie may be stored on a device or computer system (e.g., client data processing system 122) with which a session has been established and on which the non-confidential client executes, for example, on client data processing system 122 in FIG. 1. This SSO cookie is included in the request in 202 and used by Cloud Gate 112 to validate the request. The SSO cookie may include information regarding the session during which the request in 202 is generated by the client. In some embodiments, the Cloud Gate may issue its own session cookie based on the presence of IDCS session cookie.

(2) Information to protect against a Cross Site Request Forgery (CSRF) attack—In some embodiments, this information is in the form of an anti-CSRF token. As previously indicated, in certain embodiments, the trust model used for enabling the use of token relay system 102 assumes that the non-confidential client (e.g., JavaScript application 104 depicted in FIG. 1) first acquires an anti-CSRF token before the non-confidential client can request an access token using token relay system 102. This anti-CSRF token is added by the non-confidential client to the request communicated to Cloud Gate 112 in 202. The anti-CSRF token protects communications between the browser executing client 104, Cloud Gate 112, and token relay system 102.

(3) A client ID—The client ID identifies the non-confidential client.

(4) Scopes information—The scopes information may identify a list of OAuth scopes to be available in or associated with the requested access token.

(5) Origin information—Browser 104 may pass the non-confidential client's origin (e.g., Origin HTTP header).

At 204, Cloud Gate 112 is configured to validate the request received in 202. As part of this validation, Cloud Gate 112 checks for the presence of an SSO session cookie, which should be available if the user using the client has already been authenticated by IDCS 114. This SSO cookie may be the IDCS-issued SSO cookie or a session cookie issued by Cloud Gate 112 in response to the IDCS-issued SSO cookie. If the validation in 204 fails, the process for acquiring the access token is ended.

Upon successful validation in 204, at 206, Cloud Gate 112 sends a request to token relay system 102 for the requested access token. In certain embodiments, the request sent from Cloud Gate 112 to token relay system 102 includes various pieces of data received in the request received in 202, such as scopes information, anti-CSRF token, client ID, origin information, SSO cookie, etc. Additionally, the request communicated in 206 also includes an OIDC (OpenID Connect) token added by Cloud Gate 112 as a custom HTTP header. The OIDC token is an identity token and may be represented as a JWT (JavaScript Object Notation (JSON)) assertion about the user requestor and/or a reference to the client. In some embodiments, the first request received in 202 is communicated to token relay system 102 with the addition of the OIDC information.

Cloud Gate 112 may not be present in some embodiments. In such embodiments, non-confidential client 104 may send the request directly to token relay system 102.

Upon receiving the request from Cloud Gate 112 in 206, at 208, token relay system 102 is configured to perform various processing based upon the information included in the received request. Upon successful processing in 208, at 210, token relay system 102 makes an access token request to token issuer authority 110 on behalf of the non-confidential client. In some embodiments, token relay system 102 uses the Assertion flow for requesting tokens to token issuer authority 110 in IDCS 114. In certain embodiments, token relay system 102 uses the OIDC token received in the request in 206 as the user assertion and creates its own client assertion for the purpose.

In certain embodiments, the processing performed by token relay system 102 in 208 includes:

(1) Token relay system 102 validates the anti-CSRF token received in the request in 206. Further details related to the validation are provided below.

(2) Using the origin information included in the request, token relay system 102 verifies that the origin for the non-confidential client is whitelisted for the client ID. In some embodiments, null values in the origin header are rejected (requires token relay specific provisioning).

(3) Token relay system 102 identifies the requesting client based upon the client ID included in the request received in 206. Token relay system 102 then verifies that the client associated with that client ID is allowed to request the specified scopes as identified in the scoped information (requires token relay specific provisioning) in the request received in 206. In some embodiments, token relay system 102 is configured with information identifying clients and, for each client, the allowable scope(s) for the client. Token relay system 102 may use this preconfigured information to verify if the scope requested in the request received in 206 is appropriate or valid or allowed for that client.

(4) Optionally, depending on IDCS 114 capabilities, token relay system 102 may verify if the user has been explicitly granted access to the requested scopes in IDCS 114. This has the effect of further restricting the set of scopes requested by the non-confidential client.

(5) Upon successfully passing all the checks/verifications/validations, token relay system 102 creates a client assertion that is communicated to token issuer authority 110 in 210.

Token relay system 102 (or a component thereof requesting the access token) is a trusted and confidential client of token issuer authority 110. Upon receiving a request from token relay system 102, at 212, token issuer authority 110 (or IDCS 114) verifies if the scopes requested in the token request received in 210 are allowed for token relay system 102, not for non-confidential client 104. Token relay system 102 is an OAuth trusted client in IDCS 114 or for token issuer authority 110. In certain embodiments, token relay system 102 may be set up or be configured as a trusted client of IDCS 114 by a system administrator. This essentially means that IDCS 114 (or token issuer authority 110) will typically trust any assertion signed by token relay system 102 and respond back, in 214, with the requested access token as long as the scopes requested in the token request received in 210 are allowed for token relay system 102. If the scopes information requested for the access token does not match the allowed scope information, then the access token is not issued.

As indicated above, token relay system 102 is a trusted and confidential client of token issuer authority 110 (or IDCS 114). In certain embodiments, the trust between token relay system 102 and token issuer authority 110 (or IDCS 114) may be established by associating the public certificate of token relay system 102 to the client application in IDCS that represents the token relay system, such that IDCS 114 can validate the digitally signed client assertion created by token relay system 102.

At 216, token relay system 102 relays the access token received from IDCS 114 (or token issuer authority 110) in 214 all the way back to non-confidential client 104. In some embodiments, the access token is communicated as a JSON payload. Other formats may be used in alternative embodiments.

At 218, non-confidential client 104 retrieves the access token from the JSON payload received in 216 and calls the protected resource endpoint (e.g., REST resource endpoint) exposed in Cloud Gate 112 to access protected resource 108. Since the user has already been authenticated, at 220, Cloud Gate 114 then permits access to protected resource 108.

In certain embodiments, both OIDC and OAuth access tokens are propagated to the protected resource (e.g., REST Resource) as part of 220. If the protected resource is further protected by an access server, the access sever may optionally perform any further access checks using these tokens (or using other information) prior to granting access to protected resource 108.

In FIG. 2, reference 222 represents an optional path for accessing protected resource 108, where non-confidential client 104 doesn't necessarily have to invoke the REST Resource via the HTTP server that hosts Cloud Gate 112, but can do it directly. Doing it through Cloud Gate 112, however, leverages any access control enforced by Cloud Gate 112 and frees the REST Resource from dealing with CORS (Cross Object Resource Sharing) configuration. In other words, a SOP (Single Origin Policy) violation will be raised by the browser if the REST Resource is served by a different <hostname:port> than the one where the application serving the JavaScript code was loaded from.

In the manner described above, a non-confidential client such as a JavaScript application can request and acquire a properly scoped access token in a secure manner using the services of token relay system 102. Instead of a non-confidential client directly requesting access tokens from the IDCS or the token issuer authority, the non-confidential client instead requests an access token from the token relay system, which, in turn, is a trusted and confidential client of the token issuer authority and requests the access token from the token issuer authority (or IDCS) on behalf of the non-confidential client. The access token received by the token relay system from the IDCS is then relayed back to the requesting non-confidential client. The non-confidential client application may then use the token received from the token relay system to access a protected resource.

The acquisition of the access token by the non-confidential client is done without using the less secure OAuth flows such as "implicit grant" or "resource owner credential" flows. The tokens can be acquired without the end-user having to release their SSO credentials. As a result, there is now no need to limit the use of REST access from JavaScript applications to non or less critical data only. The token relay system provides a "confidential client" level security equivalent assurance for a non-confidential client such as a JavaScript application. The token relay service framework can be customized for specific web resources and browser applications (e.g., JavaScript applications) associated with the web site. The token relay service system can be used as a solution for a single web page or to serve a collection of related or trusted web pages spanning more than one web application domain.

The token relay service system described herein can be used for various Web-based user interface (UI) applications that are driven by non-confidential client applications (e.g., JavaScripts) and are used to access protected resources such as REST-based web services. The framework is particularly appropriate in enterprise class application scenarios involving sensitive and/or critical data. Enterprise-level secure UI applications can be developed using non-confidential clients such as JavaScripts without compromising security.

In some embodiments, the token relay service framework described herein may be used by various cloud services including but not limited to public, private, or hybrid cloud services. The token relay service system can be implemented in various different environments including a cloud environment (could be various types of clouds including private, public, and hybrid cloud environments), on-premises environment, a hybrid environment, and the like.

In some embodiments, the token relay service system implements the concept of a reverse proxy for non-confidential clients. This means that the service provided by token relay system 102 mediates access to the IDCS on behalf of clients such as non-confidential clients. The token relay system (or a component of the token relay system configured to request tokens from a token issuer authority) is a trusted and confidential client of the token authorization or issuer service or server that is configured to issue access tokens. For example, as described above for the embodiments depicted in FIGS. 1 and 2, the token relay system 102 is a trusted and confidential client of Identity Cloud Service (IDCS), which may include an OAuth server that is configured to serve access tokens in response to access token requests. The token relay system is capable of requesting access tokens from the IDCS on behalf of non-confidential clients such as JavaScript applications executed by a browser.

The token relay service techniques described in this disclosure may be used by various vendors to secure access to protected resources, especially where the access is requested by a non-confidential client. For example, the techniques described herein may be used where access to protected resources is controlled using an authorization protocol such as the OAuth protocol (including different versions of the OAuth protocol). OAuth clients (e.g., an application, a service) can use the OAuth protocol flows described in this disclosure to access protected resources.

The token relay system techniques described in this disclosure may also be used by a cloud services provider (e.g., by Oracle Corporation of Redwood Shores, Calif., that provide Oracle Cloud services) to secure access to services provided by the cloud service provider. For example, the token relay infrastructure may be used to provide secure access to REST endpoints of cloud services by other cloud services and user applications. The token relay service techniques described in this disclosure may be used to implement authorization from one cloud service to another. The techniques may be used to secure commercial services like, for example, SaaS (Software-as-a-Service) services, PaaS (Platform-as-a-Service) services, IaaS (Infrastructure-as-a-Service) service, and other types of cloud services.

In the embodiments described above, cloud gate 112, token relay system 102, token issuer authority 110, and a resource server protecting a protected resource are described as separate entities configured to perform certain functions. In some embodiments, one or more of these entities may be combined into a single entity that is configured to perform the functions of the entities that are combined. For example, in certain embodiments, token relay system 102 may itself be configured to issue tokens (e.g., in the form of JWT tokens) and thus also act as a token issuer. In such an embodiment, a separate token issuer authority (e.g., an OAuth server configured to issue OAuth tokens) is not needed. In certain embodiments, such a token relay system that is also configured to issue tokens may be a part of a resource server protecting a protected resource. Accordingly, the different roles and functions described above may overlap in certain embodiments.

As described above, in certain embodiments, the non-confidential client acquires an anti-CSRF token and includes that anti-CSRF token in the access token request communicated from the non-confidential client, for example, in 202 in FIG. 2. In such embodiments, the non-confidential client's request for an access token is not processed unless the request includes an anti-CSRF token.

A CSRF attack (also sometimes referred to as one-click attach or session riding) is generally an attack where a malicious client tries to leverage an existing authenticated user session for making "what appears to be" legitimate requests to a resource server. For example, a malicious program (e.g., a web site, email, blog, instant message) may cause the user's web browser 106 to perform an unwanted action on a trusted site for which the user is currently authenticated The anti-CSRF token is used to avoid such malicious behavior. An anti-CSRF token is generally a piece of non-guessable data sent by the client to the server via a custom HTTP header (for XHR clients). There are at least two levels of protection offered by an anti-CSRF token here: (1) another client is not allowed to add a custom HTTP header to the XHR, and (2) no one other than token relay system 102 is configured to process the anti-CSRF token and knows what to expect in the anti-CSRF token contents. In addition to using anti-CSRF tokens, clients applications typically also take necessary measures against XSS (Cross-Site Scripting) attacks.

Token relay system 102 can service one or even multiple clients and can provides services for acquiring multiple tokens for multiple protected resources. In the case of multiple clients, the scopes for which the individual clients can request access tokens may be different. For example, a first non-confidential client may be entitled to request an access token for a first scope that is different from a second scope for which a second non-confidential client is entitled to request an access token. Accordingly, when serving multiple clients, token relay system 102 is configured to be able to differentiate among those multiple clients and identify individual clients. This enables token relay system 102 to ensure that a particular client can request an access token for a scope that is valid for that particular client. In some embodiments, token relay system 102 provides the functionality (e.g., using a special subsystem, for example, an administration subsystem) for identifying clients and associating clients with their respective authorized scopes. The scopes information for the clients may be preconfigured and stored in a memory location accessible to token relay system 102. Such an administration subsystem may not be needed in embodiments where token relay system 102 serves only one application or client, due to which the scope is specific to that one client or application. In this manner, token relay system 102 has the intelligence to identify a requesting client and determine the appropriate scope for the requesting client.

In some embodiments, token relay system 102 can use the anti-CSRF token to differentiate between clients. A client identifier may be embedded in the anti-CSRF token obtained by a client. In certain embodiments, this client identifier may be created by token relay system 102 and it is the client id included in the request sent from the client to the Cloud Gate. In certain embodiments, a dynamic piece is used, which can either be recycled on a per-request or a per-session basis. In certain embodiments, a per-session approach, is preferred as a trade-off between security and performance. Various different techniques may be used. In one embodiment, the dynamic piece is a simple 256-bit random number that is generated on a per-session basis. In certain embodiments, the anti-CSRF token is Base64 encoded for reliable interpretations.

In certain embodiments, the following formula describes the anti-CSRF token:

Anti CSRF Token=Base64_Encode(clientID+256 bit random number)

If the token relay serves only one client or application, then there is no need for the clientID, and the formula becomes:

Anti CSRF Token=Base64_Encode(256 bit random number)

In some embodiments, the anti-CSRF token is generated via a REST endpoint provided by token relay system 102, taking the clientID as input. The end point may be invoked by the non-confidential client to request an anti-CSRF token and the endpoint response returns the anti-CSRF token (e.g., as an HTTP-only cookie). In certain embodiments, the anti-CSRF token is returned as an HTTP-only cookie, in the form of a string, and as the response payload of the anti-CSRF token endpoint, also in the form of a string. In this manner, the same value may be returned in two different ways to the client ecosystem. In embodiments, where the token is in the form of a cookie, the cookie is remembered and stored by the browser and automatically included in any further access token requests to token relay system 102 (for example, as part of the request for an access token in 202). The respond payload string value will only be visible to the original caller, which in this case is the non-confidential client, and will be validated by the token relay system that will compare it with the cookie value stored for that client application when the anti-CSRF token was issued. Accordingly, in certain embodiments, once the anti-CSRF token has been acquired, being available in the client ecosystem as a session cookie and as a value (the response payload) accessible by the non-confidential client, a subsequent request to token relay system 102 for an access token sends both values. Token relay system 102 may simply verify if both values match as part of its validation processing logic. This pattern for CSRF protection is sometimes referred to as Double Submit Cookie pattern.

As previously described with respect to FIG. 2, in 208, token relay system 102 is configured to validate the anti-CSRF token received in the request in 206. In certain embodiments, this validation comprises:

(a) Token relay system 102 looks for a named HTTP header in the request for the anti-CSRF token.

(b) In certain embodiments, token relay system 102 also looks for a named cookie containing the anti-CSRF token. For example, the named cookie is created and named by token relay system 102. The cookie may then be part of the request made by the non-confidential client for an access token. This cookie is one of the techniques that a client can use to transmit the anti-CSRF token back to token relay system 102. Another technique is via a request parameter, by which the response payload is transmitted back to token relay system 102.

(c) Token relay system 102 verifies if the HTTP header and the cookie values match. A match represents successful validation. On the other hand, if the values do not match, it represents an unsuccessful validation and the processing of the request is ended.

As described above, the token relay system may serve multiple applications, each one with access granted to potentially different audiences/scopes. In certain embodiments, token relay system 102 provides a way for a user (e.g., an administrator) to register client applications that it trusts and to set the audiences/scopes that each application is entitled to. This enables token relay system 102 to, when an access token request comes in from a particular client, to check the access token scope requested by that request with the scope registered for that client application. If the scope requested by the client application is outside the scope registered for that client, then that access token request may not be further processed. In this manner, a client is prevented from requesting an access token of a scope that is not appropriate for that client.

Figure 3:
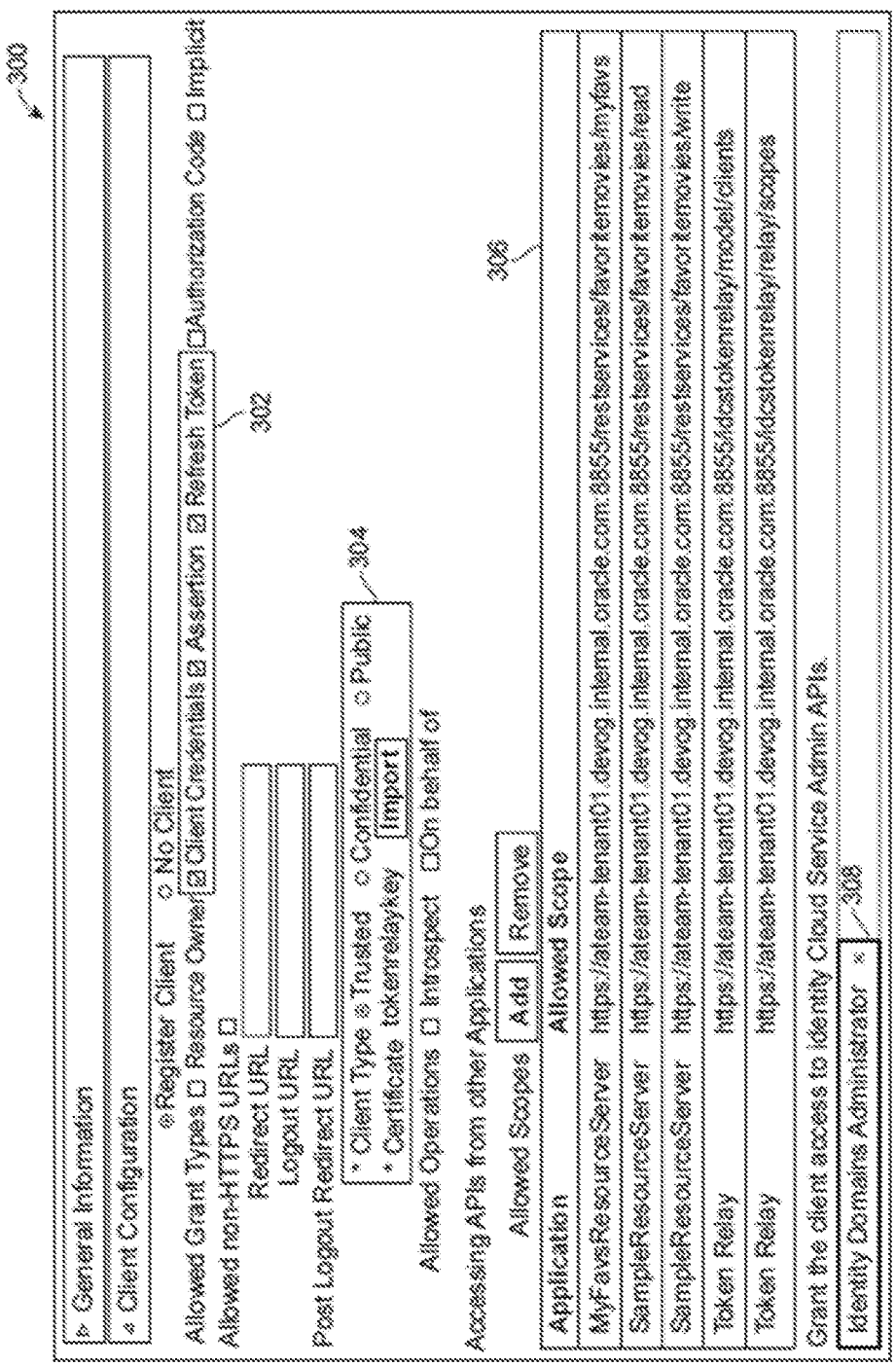
FIG. 3 depicts an example interface for registering a client application according to certain embodiments.

FIG. 3 depicts an example interface 300 for registering a client application according to certain embodiments. User interface 300 depicted in FIG. 3 and described below is only an example and is not intended to be limiting in any manner. Other interfaces may be used in alternative embodiments. In one embodiment, user interface 300 may be used to register an OAuth client application with IDCS 114 for purposes of token relay system 102.

As depicted in FIG. 3, user interface 300 provides user-selectable options for identifying client credentials and identifying token grant types. User interface 300 depicted in FIG. 3 shows that the token relay system supports the Assertion and Refresh Token grant types.

Options 304 enable the user to indicate that a client application being registered is a trusted client, a confidential client, and or a public client of the token relay system or of IDCS 114. The public key certificate corresponding to the private key that signs the client assertion may also be uploaded via options 304. The alias name (e.g., tokenrelaykey) may be provided.

User interface 300 provides options 306 for specifying the scope(s) for each of the clients being registered. These scopes represent the superset of scopes that can be requested by the client when an access token is requested. Multiple clients or applications may be registered at a time and scope(s) defined for each of the clients/applications being registered.

In certain embodiments, user interface 300 enables clients to be registered as trusted clients of token relay system 102 and/or clients of IDCS 114. For example, user interface 300 enables a client of IDCS 114 to be defined, where such a client application is capable of requesting access tokens to IDCS 114. In this context, token relay system 102 may also be considered and registered as a client of IDCS 114. User interface 300 also enables clients to be registered as clients of token relay system 102. Clients of token relay system 102 may be non-confidential client or regular confidential clients.

Using options 308, an IDCS client application representing the token relay system may be granted the Identity Domain Administration role for accessing some admin APIs of IDCS.

Token relay system 102 may serve multiple applications, potentially served from distinct origins and interested in different audiences/scopes. Therefore, token relay system 102 has a way of deciding whether or not to submit an access token request to IDCS 114 based on the request data sent from the client environment in 202.

In certain embodiments, the token relay endpoint called by the client application for requesting an access token is provisioned with some metadata in order to:

(1) Verify if the client ID sent by the non-confidential client (e.g., JavaScript application 104) is associated with the HTTP Origin HTTP header sent by the browser.

(2) Verify if the client ID and scopes sent by the non-confidential client are associated. In certain embodiments, this is part of the validations performed by token relay system 102 in 208 before making an access token request to IDCS. Token relay system 102 determines if the scopes being requested can be requested by the non-confidential client.

(3) Issue a CORS (cross origin request) Access-Control-Allow-Origin response header to inform browser 106 that the token relay endpoints whitelist specific origins. When the client origin is not the same as the token relay system origin, token relay system 102 has to be able to inform the browser whether or not it is okay for the request to be made. By whitelisting specific origins and the client origin is part of this whitelist, token relay system 102 can tell the browser that the request is okay to be made. For example, see the third row of Table A below.

As one example, the following metadata shown in Table A may be provisioned to and stored by token relay system 102:

TABLE A

| Client ID | Origin | Scopes |
| --- | --- | --- |
| ABC_ReadWrite_App | http://www.abc.com | read, write |
| ABC_Read_App | http://www.abc.com | read |
| XYZ_ReadWrite_App | http://www.xyz.com | read, write |

Further assuming that token relay service itself is served by http://www.abc.com, based upon Table A:

A request from a client identified by client ID "ABC_ReadWrite_App" must be originated from http://www.abc.com and can request scopes read and write. Since it shares the same origin (http://www.abc.com) as the token relay service, the browser's Same Origin Policy is already satisfied and no CORS response header is needed;

A request from a client identified by client ID "ABC_Read_App" must be originated from http://www.abc.com and can only request the read scope. Since it shares the same origin as the token relay, browser's Same Origin Policy is already satisfied and no CORS response header is needed;

A request from a client identified by client ID "XYZ_ReadWrite_App" must be originated from http://www.xyz.com and can request scopes read and write. Since it does not share the same origin as the token relay, a CORS Access-Control-Allow-Origin header with the value http://www.xyz.com is sent in the token relay response thus signaling the browser to proceed with the operation, either reading the contents of a GET response or proceeding to the POST request following the pre-flight response. In certain embodiments, when a POST request with custom headers (which is the case for token relay system 102 usage, since the anti-CSRF token is in the access token request) is about to be made, the browser actually makes an OPTIONS request first, essentially asking the service endpoint if the to-be-made POST request is allowed. Then it is the responsibility of the service (e.g., the token relay system) to respond if the requesting Origin can make the call. This is part of the CORS specification implemented by modern web browsers. The pre-flight response refers to the response of the OPTIONS request explained above, which is known as the pre-flight request.

The same token relay system 102 may be used to service different web applications/clients trying to access different resources (e.g., accessing different websites). For example, the same token relay system 102 can service JavaScripts rendered from different domains.

In certain embodiments, CORS policies may be configured such that a web application client is tied to the same token relay system even though the domain of the web application is different from the domain of the token relay system. This overcomes the problem of the client (e.g., JavaScript application) being rendered from one domain and the token relay system is in a different domain. Typically, otherwise, the JavaScript would not be permitted to invoke a web resource from a different domain.

In certain embodiments, clients that have received access tokens using token relay system 102 may cache the access tokens for subsequent usage. The anti-CSRF tokens obtained by the clients may also be cached by the clients for subsequent use. Upon logout, the client's cache data may be cleaned up including any cached tokens.

From a security perspective, a common question is whether access tokens should be requested for each resource request or whether a single access token acquired for a resource can be used for accessing the resource multiple times within a given client or application. Access tokens, by definition, have an associated expiration time. Therefore, it is reasonable to reuse the access token obtained for a resource for accessing the same resource as long as the access token has not expired. This is encouraged in certain embodiments.

An access token is granted to a client for a particular scope, where the scope is within and does not exceed the scope registered for that client. In OAuth, an OAuth scope conveys one or more privileges granted to an OAuth client either by an end user or by an administrator for accessing resources that either belong to the user or belong to the client itself. At access token issuance time, the OAuth server (e.g., token issuer authority 110) adds scopes to the access token that is issued and communicated to token relay system 102 in 214 and then on to the non-confidential client in 216 in FIG. 2. Following the "least privilege" principle, the goal here is to avoid privilege leakage. In other words, an access token is not granted more power than what it really needs.

There might be some applications for which it may be reasonable to grant a single "powerful" access token carrying all required allowable scopes. Some other applications may require that each resource is accessed using an access token carrying a specific single scope. Some other applications may be in between, where an access token should give access to a subset of resources (e.g., to a subset of the resource endpoints). In certain embodiments, the decision factor as to the scope to be given for an access token lies on the sensitivity of the endpoints being accessed. For example, if an application needs to change an account balance and also generate an account statement, issuing a single access token carrying the two privileges (write_account and read-account scopes, for instance) may be a bad idea. In this case, it may be better and safer from a security perspective to issue an access token for changing the balance and a separate one for the generating the account statement. This is because, although access tokens are issued in the context of a given client and are meant for a given client, the access token may be stolen from the clients, and hence it is preferable to be on the safe side as much as possible and limit the scope of an issued access token.

The infrastructure described herein can be implemented in various different environments including a cloud environment (could be various types of clouds including private, public, and hybrid cloud environments), on-premises environment, a hybrid environment, and the like.

Figure 4:
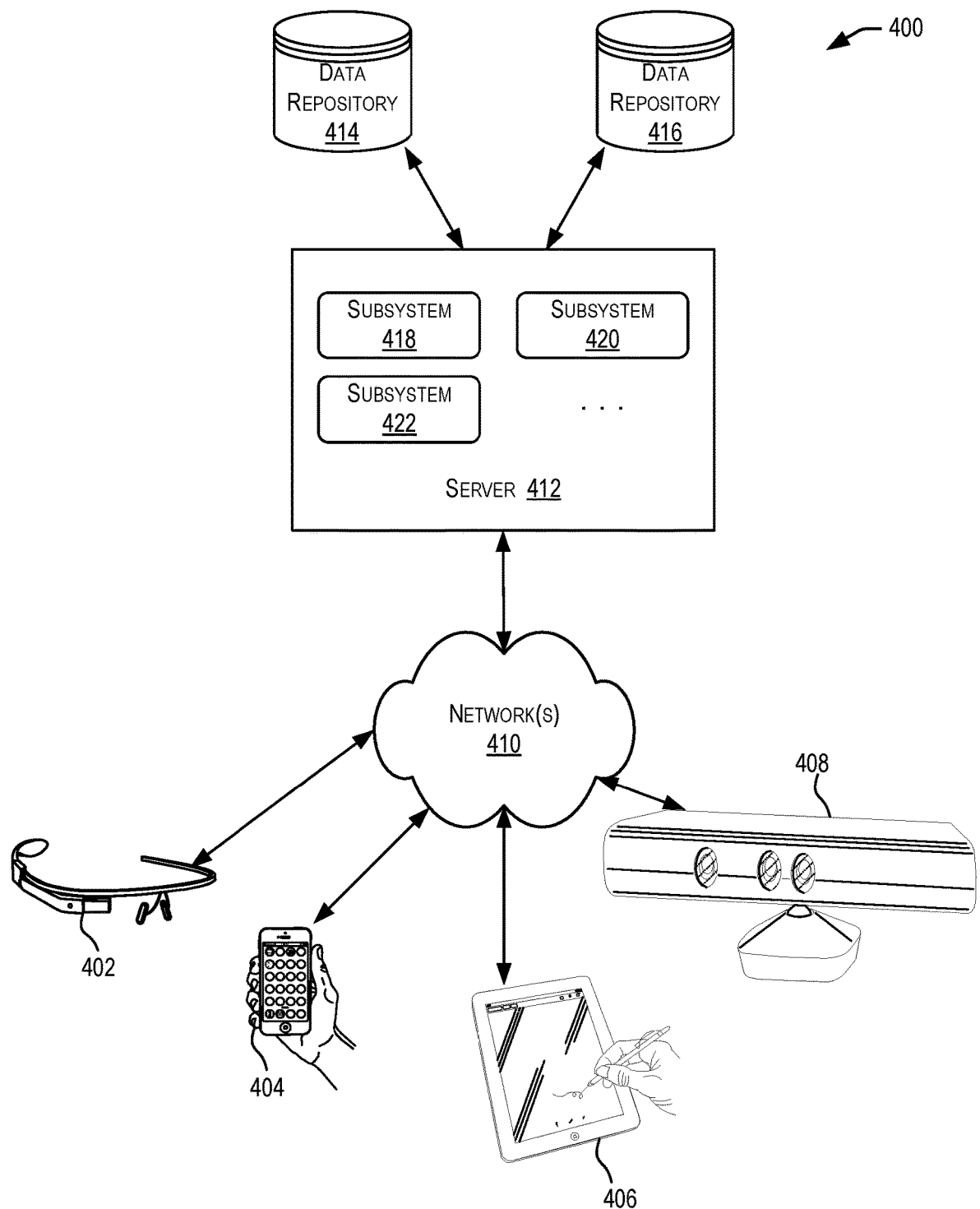
FIG. 4 depicts a simplified diagram of a distributed system for implementing an embodiment.

FIG. 4 depicts a simplified diagram of a distributed system 400 for implementing an embodiment. In the illustrated embodiment, distributed system 400 includes one or more client computing devices 402, 404, 406, and 408, coupled to a server 412 via one or more communication networks 410. Clients computing devices 402, 404, 406, and 408 may be configured to execute one or more applications, including non-confidential clients, that may use the services of a token relay system for acquiring access tokens. In various embodiments, server 412 may be adapted to run one or more services or software applications that enable the token relay service described herein.

In certain embodiments, server 412 may also provide other services or software applications that can include non-virtual and virtual environments. In some embodiments, these services may be offered as web-based or cloud services, such as under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, server 412 may include one or more subsystems 418, 420 and 422 that implement the functions performed by server 412. These subsystems may be implemented using software that may be executed by one or more processors, hardware, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, and/or 408 to execute one or more applications in accordance with the teachings of this disclosure. A client device may provide an interface that enables a user of the client device to interact with the client device. The client device may also output information to the user via this interface. Although FIG. 4 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®)), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 410 may be any type of network familiar to those skilled in the art that can support data communications using any of a variety of communication protocols, including without limitation TCP/IP (transmission control protocol/Internet protocol), SNA (systems network architecture), IPX (Internet packet exchange), AppleTalk®, and the like. Merely by way of example, network(s) 410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 412 may be implemented using one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization such as one or more flexible pools of logical storage devices that can be virtualized to maintain virtual storage devices for the server. In various embodiments, server 412 may be adapted to run one or more services or software applications that provide the functionality described in the foregoing disclosure.

The computing systems in server 412 may run one or more operating systems including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 412 may include one or more applications to analyze and consolidate data feeds and/or event updates received from client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more data repositories such as repositories 414 and 416. These data repositories may be used to store data and other information in certain embodiments. Data repositories 414 and 416 may reside in a variety of locations. For example, a data repository used by server 412 may be local to server 412 or may be remote from server 412 and in communication with server 412 via a network-based or dedicated connection. Data repositories 414 and 416 may be of different types. In certain embodiments, a data repository used by server 412 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 414 and 416 may also be used by applications to store application data. The data repositories used by applications may be of different types such as, for example, a key-value store repository, an object store repository, or a general storage repository supported by a file system.

Figure 5:
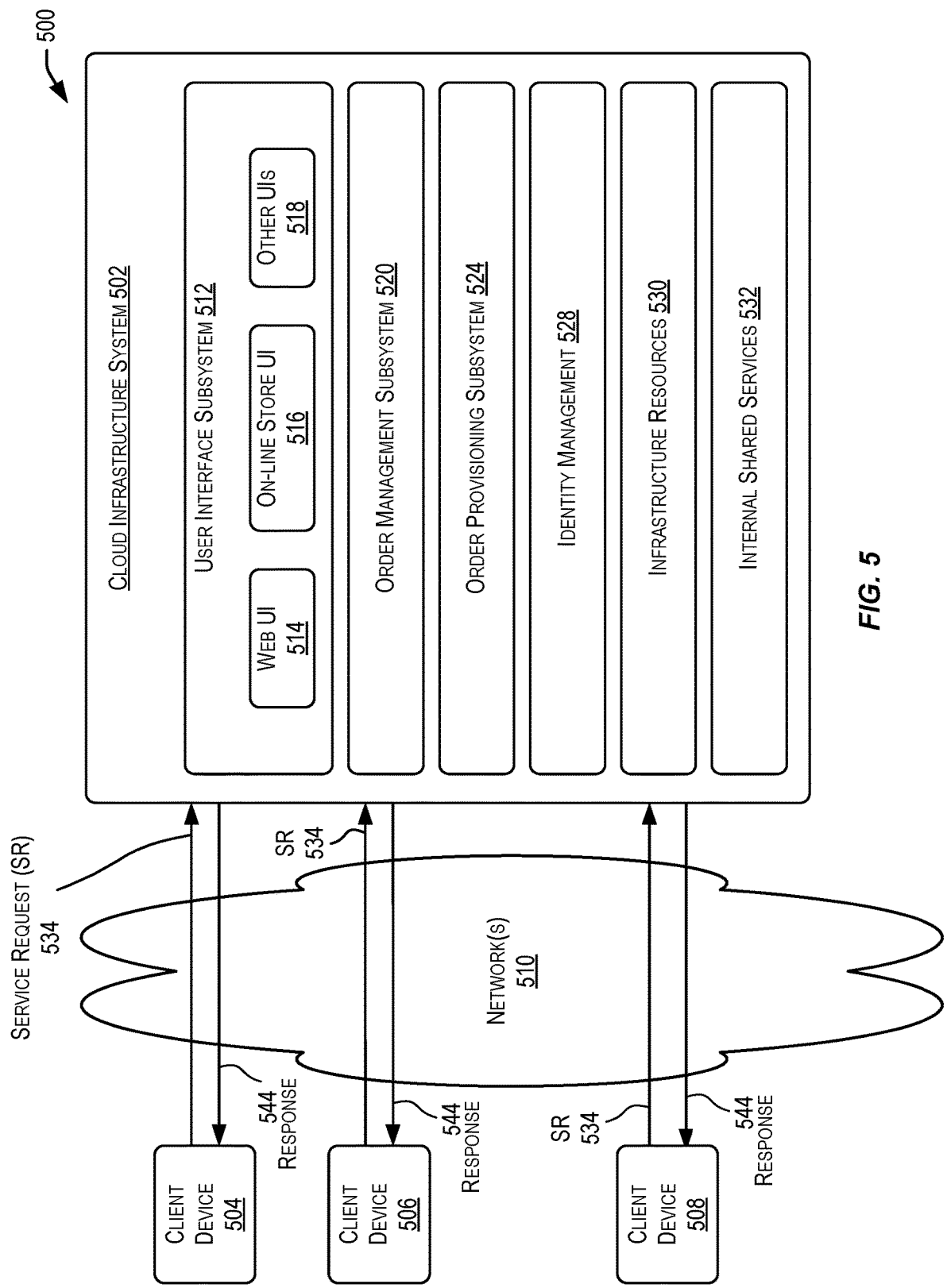
FIG. 5 is a simplified block diagram of a cloud-based system environment in which various services may be offered as cloud services, in accordance with certain embodiments.

In certain embodiments, the various functionalities described in this disclosure may be offered as services via a cloud environment. FIG. 5 is a simplified block diagram of a cloud-based system environment in which various services may be offered as cloud services, in accordance with certain embodiments. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other embodiments, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative embodiments.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 502. Cloud infrastructure system 502 then performs processing to provide the services requested in the customer's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public customer, where the customer can be an individual or an enterprise. In certain other embodiments, under a private cloud model, cloud infrastructure system 502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a token relay service provided by cloud infrastructure system 502.

In some embodiments, the processing performed by cloud infrastructure system 502 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain embodiments, to facilitate efficient provisioning of these resources for supporting the various cloud services provided by cloud infrastructure system 502 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users or customers of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a customer may, using a client device, request (service request 534) one or more services provided by cloud infrastructure system 502 using one or more of interfaces 514, 516, and 518. For example, a customer may access the online store, browse cloud services offered by cloud infrastructure system 502, and place a subscription order for one or more services offered by cloud infrastructure system 502 that the customer wishes to subscribe to. The service request may include information identifying the customer and one or more services that the customer desires to subscribe to.

In certain embodiments, such as the embodiment depicted in FIG. 5, cloud infrastructure system 502 may comprise an order management subsystem (OMS) 520 that is configured to process the new order. As part of this processing, OMS 520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 502 may send a response or notification 544 to the requesting customer to indicate when the requested service is ready for use. In some instances, information (e.g., a link) may be sent to the customer that enables the customer to start using and availing the benefits of the requested services.

Cloud infrastructure system 502 may provide services to multiple customers. For each customer, cloud infrastructure system 502 is responsible for managing information related to one or more subscription orders received from the customer, maintaining customer data related to the orders, and providing the requested services to the customer. Cloud infrastructure system 502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 502 may provide services to multiple customers in parallel. Cloud infrastructure system 502 may store information for these customers, including possibly proprietary information. In certain embodiments, cloud infrastructure system 502 comprises an identity management subsystem (IMS) 528 that is configured to manage customers information and provide the separation of the managed information such that information related to one customer is not accessible by or exposed to another customer. IMS 528 may be configured to provide various security-related services such as identity services, such as information access management, authentication and authorization services, services for managing customer identities and roles and related capabilities, and the like.

Figure 6:
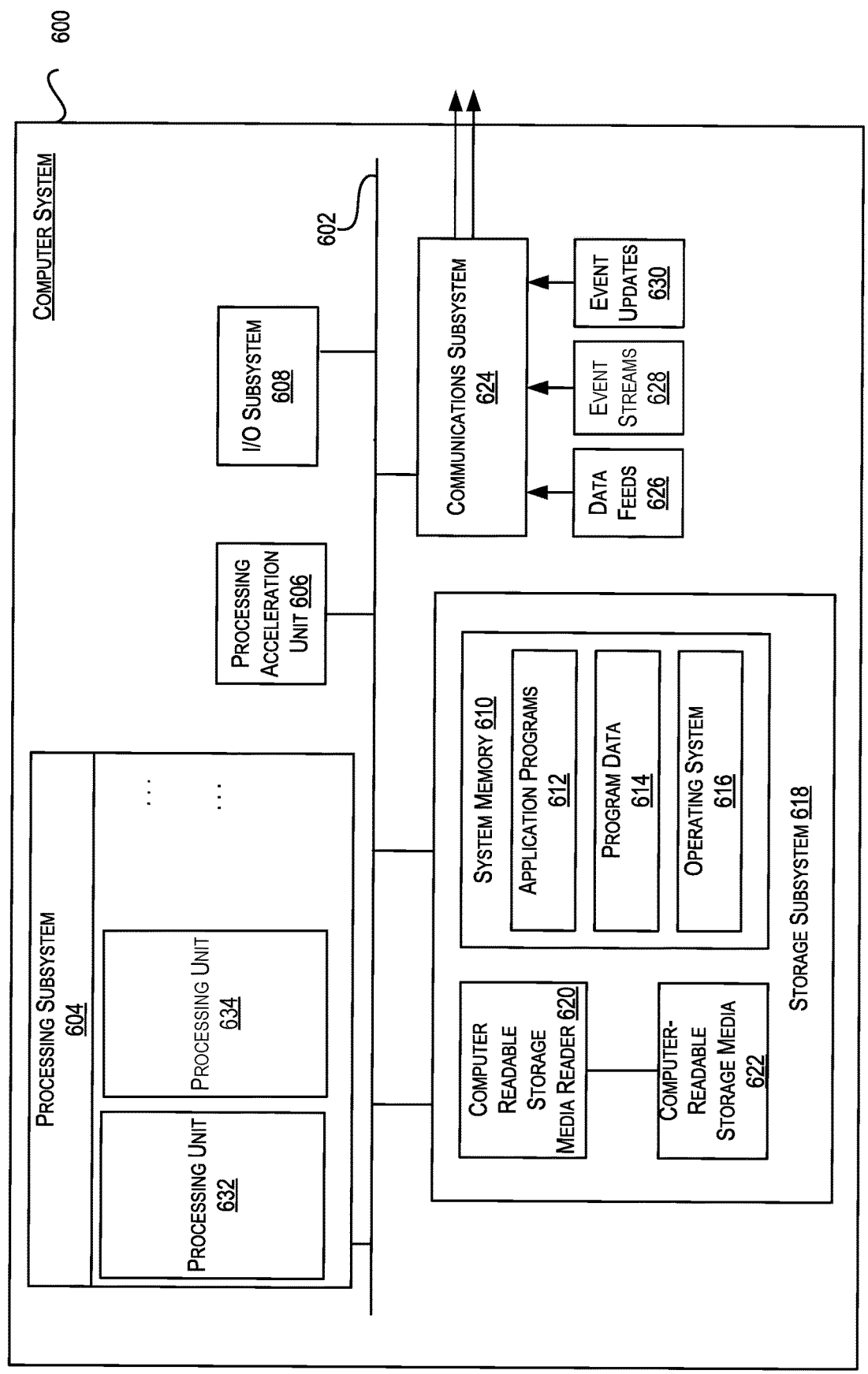
FIG. 6 illustrates an exemplary computer system that may be used to implement certain embodiments.

FIG. 6 illustrates an exemplary computer system 600 that may be used to implement certain embodiments. For example, computer system 600 may, along with zero or more other computer systems, provide the token relay service framework described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610. The embodiment depicted in FIG. 6 is merely an example and is not intended to unduly limit the scope of claimed embodiments. One of ordinary skill in the art would recognize many possible variations, alternatives, and modifications. For example, in some implementations, computer system 600 depicted in FIG. 6 may have more or fewer subsystems than those shown in FIG. 6, may combine two or more subsystems, or may have a different configuration or arrangement of subsystems.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain embodiments, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some embodiments. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some embodiments. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 618 may also include a computer-readable storage media reader 620 that can further be connected to computer-readable storage media 622. Reader 620 may receive and be configured to read data from a memory device such as a disk, a flash drive, etc.

In certain embodiments, computer system 600 may support virtualization technologies, including but not limited to virtualization of processing and memory resources. For example, computer system 600 may provide support for executing one or more virtual machines. In certain embodiments, computer system 600 may execute a program such as a hypervisor that facilitates the configuring and managing of the virtual machines. Each virtual machine may be allocated memory, compute (e.g., processors, cores), I/O, and networking resources. A virtual machine may run independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as, in addition to others, structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Computer systems, such as computer system 600 depicted in FIG. 6, may be used to implement the various systems depicted in FIG. 1.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by a token relay system from a token relay service endpoint, a first request for an access token for enabling a client to access a resource, wherein the token relay system is a confidential client of a token issuer system, wherein the first request for the access token for enabling the client to access the resource received by the token relay system comprises scopes information identifying one or more authorization scopes associated with the requested access token, wherein the scopes information is configured for each client of a plurality of clients and stored in a memory location;
responsive to receiving the first request, determining, by the token relay system, that the client is known to the token relay system;
verifying, by the token relay system, that the client is authorized to request the access token based on information in the received first request;
responsive to verifying that the client is authorized to request the access token, transmitting, from the token relay system to the token issuer system, a second request requesting the access token on behalf of the client;
receiving, by the token relay system from the token issuer system, the access token issued by the token issuer system in response to the second request; and
communicating, by the token relay system to the client, the access token received by the token relay system from the token issuer system, wherein the access token communicated to the client is associated with the scopes information configured for the client and enables the client to access the resource via the token relay service endpoint.

2. The method of claim 1 wherein the client is a non-confidential client.

3. The method of claim 1 wherein the client is an application executed by a browser.

4. The method of claim 3 wherein the application is a JavaScript application.

5. The method of claim 1 further comprising, using, by the client, the access token to access the resource.

6. The method of claim 5 wherein the resource is a REST resource.

7. The method of claim 1 wherein:
the first request includes information identifying a scope for the access token; and the access token received by the token relay system from the token issuer system is for the scope identified in the first request.

8. The method of claim 1 wherein the first request comprises:
information identifying a scope for which the access token is requested;
an anti-CSRF (Cross Site Request Forgery) token;
information identifying an origin for the client; and
single sign-on information for a session during which the first request is generated by the client.

9. The method of claim 8 further comprising:
performing by the token relay system prior to transmitting the second request to the token issuer system:
validating, by the token relay system, the anti-CSRF token; and
verifying, by the token relay system, that the client is allowed to request a token for the scope identified in the first request.

10. The method of claim 8 wherein the anti-CSRF token encodes an identifier identifying the client from whom the first request is received by the token relay system.

11. The method of claim 1 wherein the first request is received by the token relay system as part of an authenticated user session.

12. The method of claim 1 wherein the token issuer system is a server configured to issue tokens according to OAuth standard.

13. A non-transitory computer readable storage medium storing a plurality of instructions executable by one or more processors of a token relay system, wherein the plurality of instructions when executed by the one or more processors causes the one or more processors to perform processing comprising:
requesting, by a token relay service endpoint, a token from a token issuer authority on behalf of a client, wherein the token relay system is a confidential client of the token issuer authority, wherein the request for the token comprises scopes information identifying one or more authorization scopes associated with the requested token, wherein the scopes information is configured for each client of a plurality of clients and stored in a memory location;
responsive to the requesting, determining that the client is known to the token relay system;
verifying that the client is authorized to request the token;
responsive to verifying that the client is authorized to request the token, transmitting a second request requesting the token on behalf of the client;
receiving an access token issued by the token issuer authority; and
communicating the access token received from the token issuer authority to the client, wherein the access token communicated to the client is associated with the scopes information configured for the client and enables the client to access a resource via the token relay service endpoint.

14. The non-transitory computer readable storage medium of claim 13 wherein the client is a non-confidential client.

15. The non-transitory computer readable storage medium of claim 14 wherein the client is a JavaScript application executed by a browser.

16. The non-transitory computer readable storage medium of claim 13, further comprising instructions for causing the one or more processors to perform processing comprising:
receiving a first request for the access token that enables the client to access the resource, wherein the first request comprises information identifying a scope for which the access token is requested.

17. The non-transitory computer readable storage medium of claim 16 wherein the access token issued by the token issuer authority is for the scope identified in the first request.

18. The non-transitory computer readable storage medium of claim 16 wherein the first request comprises:
information to protect against a Cross Site Request Forgery (CSRF) attack;
information identifying an origin for the client; and
session information for a session during which the first request is generated by the client.

19. The non-transitory computer readable storage medium of claim 18 wherein the processing further comprises:
performing prior to requesting the token from the token issuer authority on behalf of the client:
validating the information to protect against a CSRF attack; and
verifying that the client is allowed to request the access token for the scope identified in the first request.

20. A token relay system comprising:
one or more processors; and
a memory storing a plurality of instructions executable by the one or more processors, wherein the plurality of instructions when executed by the one or more processors causes the one or more processors to perform processing comprising:
receiving, from a token relay service endpoint, a first request from a non-confidential client for an access token for enabling the non-confidential client to access a resource, the first request including information identifying a scope for which the access token is requested, wherein the token relay system is a confidential client of a token issuer system, wherein the first request comprises scopes information identifying one or more authorization scopes associated with the requested access token, wherein the scopes information is configured for each client of a plurality of clients and stored in a memory location;
responsive to receiving the first request, determining, by the token relay system, that the client is known to the token relay system;
verifying, by the token relay system, that the client is authorized to request the access token based on information in the received first request;
responsive to verifying that the client is authorized to request the access token, transmitting to the token issuer system, a second request requesting the access token on behalf of the non-confidential client for the scope identified in the first request;
receiving, from the token issuer system, the access token issued by the token issuer system in response to the second request; and
communicating, to the non-confidential client, the access token received from the token issuer system, wherein the access token communicated to the non-confidential client is associated with scopes information configured for the non-confidential client and enables the non-confidential client to access the resource via the token relay service endpoint.

* * * * *